May 1, 1945.   J. T. NOCK   2,374,830
GAUGE
Filed Sept. 9, 1943
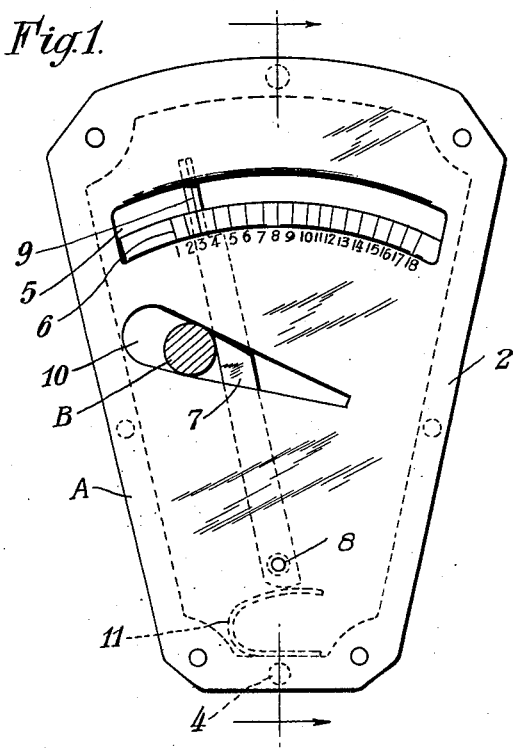
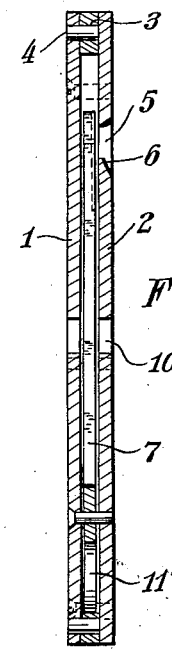
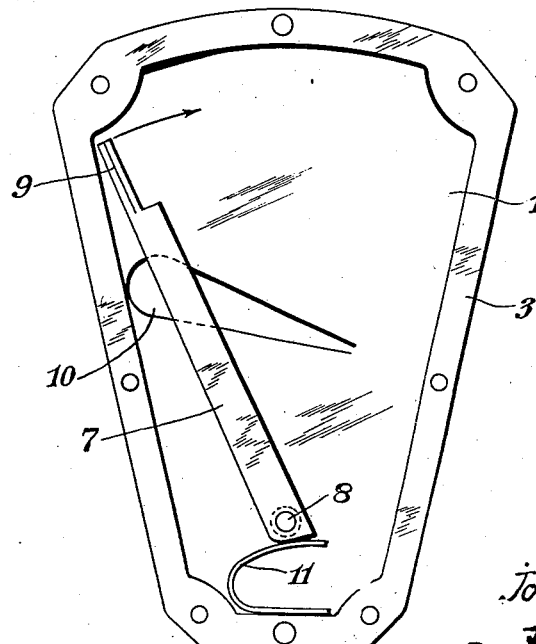
INVENTOR.
JOHN THOMAS NOCK.
By: Francis D. Boyce
ATTORNEY.

Patented May 1, 1945

2,374,830

UNITED STATES PATENT OFFICE 2,374,830

GAUGE

John Thomas Nock, Weston-super-Mare, England, assignor of one-half to L. Copley-Smith & Sons, Limited, Manchester, England, a company of Great Britain Application September 9, 1943, Serial No. 501,627
In Great Britain September 10, 1942

3 Claims. (Cl. 33—178)

This invention relates to gauges more particularly intended for determining the size of knitting needles, although the invention has other applications, for example, for determining the gauge of wire and other articles of circular cross section. The principal object of the invention is to provide a simple form of device which will enable the size of knitting needles to be readily ascertained.

According to the invention a gauge for the purpose described comprises a housing having pivotally mounted therein a spring-controlled finger operative in conjunction with a tapered aperture and movable over a scale marking on said housing.

The tapered aperture is for the introduction of the needles to be gauged and forms an abutment for the needle when traversed from the wider end towards the narrower end moving the finger therewith, the finger indicating on a suitable scale the gauge of the knitting needle when the latter comes to rest in the aforesaid slot.

In order that the invention may be clearly understood, reference is directed to the accompanying drawing wherein:

Figure 1 is a front elevation of a knitting needle gauge in accordance with the invention.

Figure 2 is a section on the line 2—2 Fig. 1, looking in the direction of the arrow.

Figure 3 is a similar view to Figure 1 with the front portion thereof removed.

In the preferred construction according to the invention which is illustrated in the drawing, the gauge comprises a housing A formed from substantially truncated triangular plates comprising a back plate 1 and a complementary front plate 2 spaced apart by a marginal distance fillet 3, the whole being secured together to provide the housing by means of screws 4. The housing A is provided with an arcuate slot 5 in the front plate 2, one edge of the slot being bevelled and provided with scale markings or graduations as at 6. An indicating needle or finger 7 is pivotally mounted as at 8 between the plates 1 and 2 forming the sides of the housing and adjacent the truncated end thereof in such a manner as to be movable from side to side of the casing behind said scale 6 and visible through said slot 5, the finger 7 having a longitudinal line 9 for assisting in accurate reading. Intermediate the aforesaid slot 5 and the pivotal point 8 of the indicator finger 7 the housing A is formed with a taper slot 10 which extends from front to rear of the housing through both plates 1 and 2 so that a knitting needle indicated in section at B may be passed therethrough and protrude from both faces of the housing. The width and taper of the slot 10 are so calibrated that when a knitting needle for example is passed through the wider end of the slot and then moved towards the narrower end thereof pushing the indicator finger 7 before it, the scale 6 will correctly register the standard size of the knitting needle when it comes to rest between the walls of the slot 10 which thereby form an abutment. The indicating finger 7 is under spring pressure by a C-spring 11 so that the finger will bear against the knitting needle with the tip of the finger or line 9 indicating the correct size thereof. Upon withdrawal of the knitting needle the finger 7 is returned to its initial position at the wider end of the taper slot under the influence of the spring 11.

The device may be readily manufactured in plastic, artificial resin, or other phenol-formaldehyde product, and in practice the front and rear plates would be moulded as independent sections of which the rear section would be moulded in one with the marginal fillet, the two sections being suitably connected together with the indicating finger pivotally mounted in the space between the two sections.

What I claim and desire to secure by Letters Patent is:

1. A gauge of the class described including a plate having an arcuate slot provided with graduations along one edge, said plate further having a tapered transversely extending slot, and an indicating finger pivoted substantially at the center of the arc of the arcuate slot.

2. A gauge of the class described including a plate having an arcuate slot provided with graduations along one edge, said plate further having a transversely extending tapered slot, an indicating finger pivoted at the center of the arc of the arcuate slot, and extending across said slots, and a spring engaging said finger and urging it towards the larger end of the tapered slot.

3. A gauge of the class described including a front plate having an arcuate slot provided with scale graduations along one edge, said plate further having a transversely extending tapered slot, a back plate having a transversely extending tapered slot registering with the like slot in the front plate, means to space said plates, an index finger pivoted at the center of the arc of the arcuate slot between said plates and extending across said slots, and a spring engaging said finger and urging it toward the larger ends of the tapered slots.

JOHN THOMAS NOCK.